United States Patent

Kusunose et al.

[11] Patent Number: 5,771,097
[45] Date of Patent: Jun. 23, 1998

[54] MACH-ZEHNDER TYPE INTERFEROMETER

[75] Inventors: Haruhiko Kusunose; Naoki Awamura, both of Yokohama, Japan

[73] Assignee: Lasertec Corporation, Yokohama, Japan

[21] Appl. No.: 694,522

[22] Filed: Aug. 9, 1996

[30] Foreign Application Priority Data

Aug. 15, 1995 [JP] Japan .................................. 7-208194

[51] Int. Cl.$^6$ ...................................................... G01B 9/02
[52] U.S. Cl. ............................................................. 356/353
[58] Field of Search .................................. 356/353, 452; 359/871, 872

[56] References Cited

U.S. PATENT DOCUMENTS 5,583,638  12/1996  Cutler ........................................ 356/346

*Primary Examiner*—Frank G. Font
*Assistant Examiner*—Amanda Merlino
*Attorney, Agent, or Firm*—Oliff & Berridge, P.L.C.

[57] ABSTRACT

An interferometer of Mach-Zehnder type includes a first half mirror dividing an entrance light flux into first and second light fluxes, a first reflection mirror reflecting the first light flux toward a second half mirror, and a second reflection mirror reflecting the second light flux toward the second half mirror. At the second half mirror, the first and second light fluxes are mixed to derive an exit light flux including interference fringes. The first half mirror and first reflection mirror are secured to opposing side walls of a first hollow supporting block made of ceramics, and the second half mirror and second reflection mirror are secured to a second hollow supporting blocks made of ceramics. The first and second supporting blocks are coupled with each other at their side walls and an assembly of the supporting blocks is mounted on a surface of an optical bench by means of kinetic mounts. The half mirrors and reflection mirrors can be provided easily and precisely, and shrinkage and expansion of the optical bench due to a temperature variation do not produce any stress of the optical elements.

14 Claims, 12 Drawing Sheets

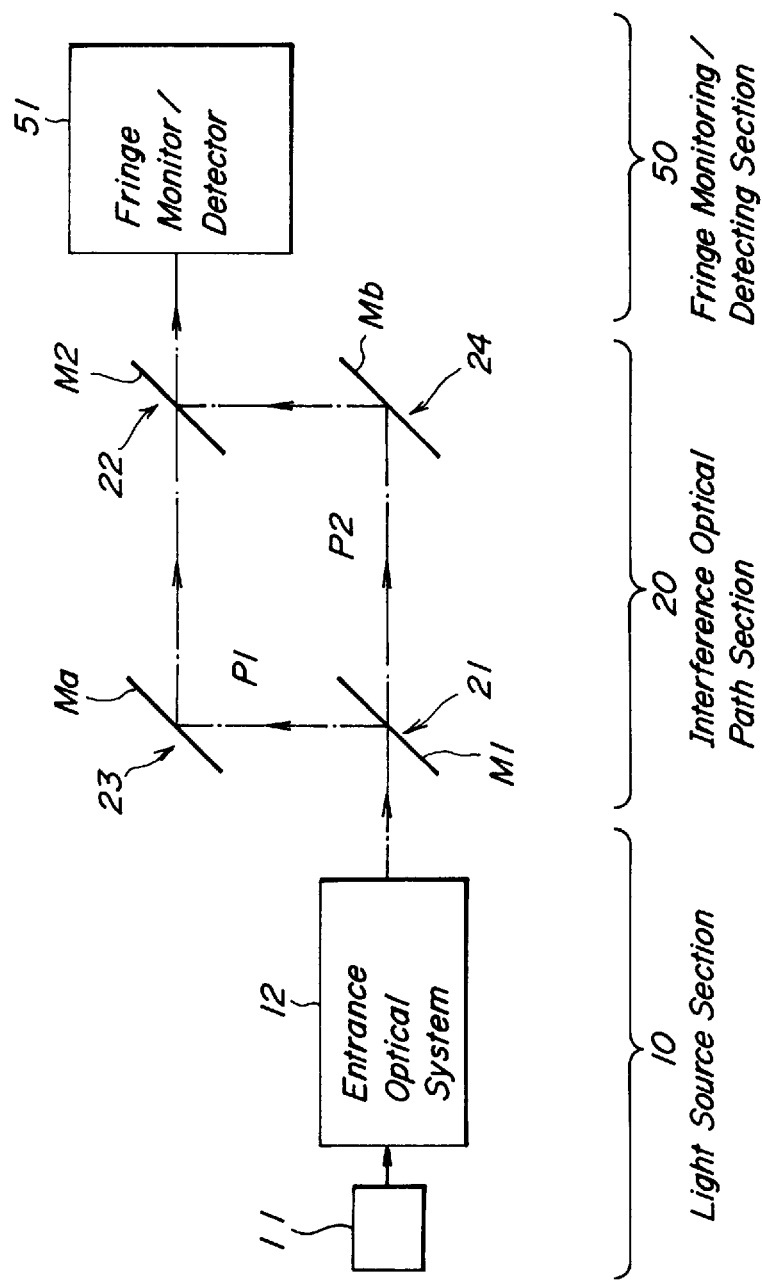

FIG_3
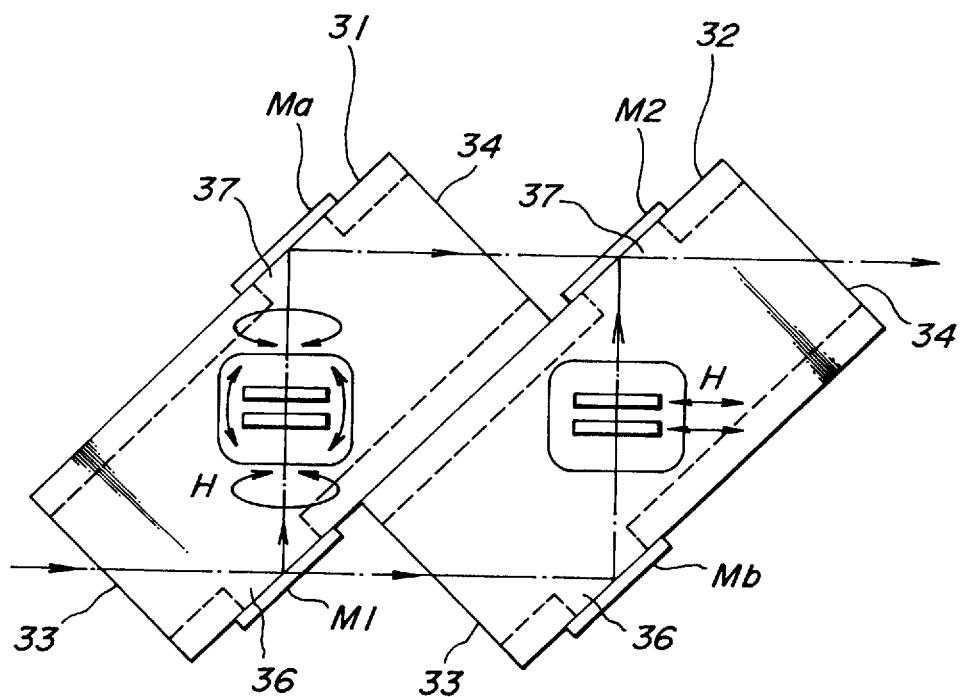

FIG_4
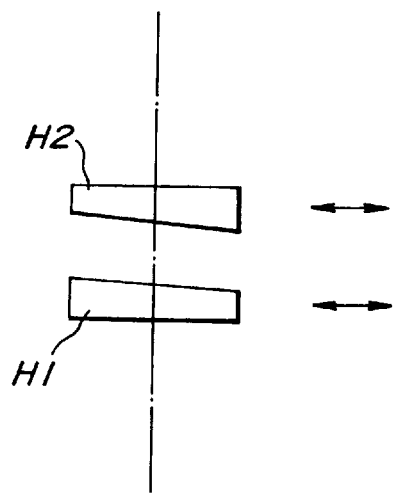
FIG_5A
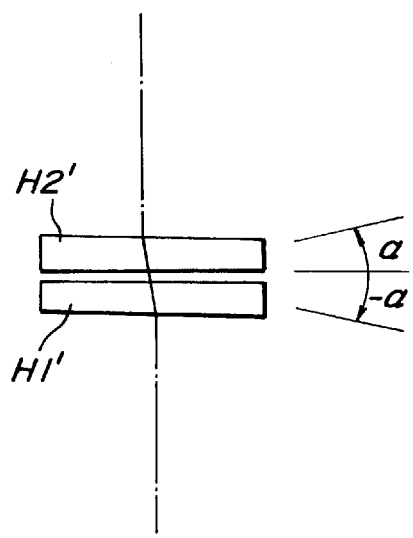
FIG_5B
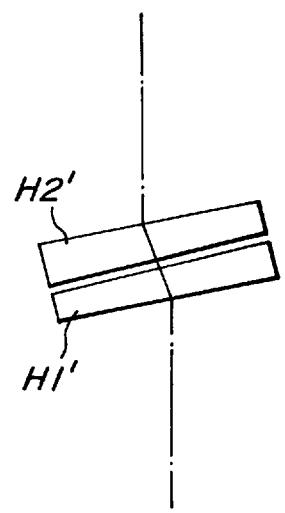

MACH-ZEHNDER TYPE INTERFEROMETER

BACKGROUND OF THE INVENTION

1. Field of the Invention

The present invention relates to an interferometer, and more particularly to an interferometer of Mach-Zehnder type.

2. Related Art Statement

The Mach-Zehnder type interferometer comprises two half mirrors and two reflection mirrors, and may be classified into a two light flux type interferometer, in which a light beam emitted from a light source is divided into two light beams, these two light beams propagate along different optical paths, and then these light beams are mixed. In this type of interferometer may be utilized for checking and measuring various features of specimens placed in an optical path by analyzing interference fringes. For instance, surface roughness, thickness, displacement, fine structures of specimens can be detected.

FIG. 1 is a schematic diagram showing a known typical Mach-Zehnder type interferometer. Half mirrors M1 and M2 are arranged at diagonally opposing corners of a rectangular and reflection mirrors Ma and Mb are arranged at the remaining opposing corners. A light beam emitted from a light source not shown is first made incident upon the half mirror M1 and is divided thereby into first and second light beams. Therefore, the half mirror M1 serves as a light beam dividing element. Then, the first and second light beams are reflected by the reflection mirrors Ma and Mb, respectively, Therefore, these reflection mirrors Ma, Mb serve as a light beam deflecting element. Then, the first and second light beams are made incident upon the half mirror M2 serving as a light beam mixing element. A first light path formed by the half mirror M1, reflection mirror Ma and half mirror M2 has a different length than that of a second light path formed by the half mirror M1, reflection mirror Mb and half mirror M2. Therefore, by mixing the first and second light beams by the half mirror M2, there are produced interference fringes.

In this type of interferometer, when a transparent specimen is placed in one of the first and second optical paths, obtained interference fringes are changed. Therefore, by analyzing this change in the interference fringes, surface conditions and refractive index of the specimen can be detected.

In FIG. 1, a reference H denotes compensators for adjusting optical path lengths of the first and second optical paths. These compensators may be formed by optical wedges. Compensators H are arranged in both the first and second optical paths and one of them is arranged removably from the optical path. In FIG. 1, the compensator H in the second optical path is arranged removably with respect to the second optical path.

In the known Mach-Zehnder type interferometer, the half mirrors M1, M2 and reflection mirrors Ma, Mb are supported or fixed by respective mirror holders Mh as diagrammatically shown in FIG. 1. Then, operation of setting and adjusting the mirrors by using the respective mirror holders Mh is liable to be very cumbersome and time consuming and require a highly skilled person. Moreover, the Mach-Zehnder interferometer is inherently subjected to mechanical shock or vibration. In this manner, there has been not provided a Mach-Zehnder interferometer, in which the assembling and adjusting can be performed in a simple manner without requiring a skill of a human being, and stable characteristics can be attained for mechanical vibration during a usage.

Moreover, in order to detect and measure a specimen with a required precision and sensitivity, it is also required to attain a stability for a temperature variation.

SUMMARY OF THE INVENTION

The present invention has for its object to provide a novel and useful interferometer which can be manufactured and adjusted easily without requiring a skill of a human being and provide stable characteristics for a temperature variation.

It is another object of the invention to provide an interferometer, in which an angle of a mirror can be determined precisely by means of a simple structure.

It is still another object of the invention to provide an interferometer, in which characteristics can be stable for a temperature variation.

According to the invention, an interferometer of Mach-Zehnder type comprises:

an optical bench having a surface;

an optical system including a plurality of optical elements and performing a division of an input light flux, a formation of divided optical paths, and a mixing of light fluxes;

a supporting means including at least two hollow supporting blocks, each of which has at least two optical element securing portions for securing at least two optical elements of said optical system, light fluxes propagating through hollow inner spaces of said supporting blocks; and a means for mounting said supporting means on said surface of the optical bench.

In a preferable embodiment of the interferometer according to the invention, said optical system includes a first optical element for dividing an input light flux from a light source into first and second light fluxes propagating along first ant second optical paths, second and third optical elements for defining said first and second optical paths, respectively, and a fourth optical element for mixing said first and second light fluxes propagating along said first and second optical paths into a single output light flux which generates interference fringes, and said supporting means includes first and second hollow rectangular supporting blocks, said first supporting block supporting said first and second optical elements and said second supporting block supporting said third and forth optical elements.

In the interferometer of Mach-Zehnder type according to the invention, since at least two optical elements constituting optical paths are secured to a single supporting block, and then the supporting block is arranged on the optical bench, the arrangement and adjustment of the optical elements can be performed easily in a precise manner. Moreover, the interferometer according to the invention is stable for mechanical shock. Furthermore, when the supporting blocks are mounted on the optical bench by means of kinetic mounts as will be explained in a preferable embodiment of the interferometer according to the invention, even if the optical bench is expanded or shrunk due to a temperature variation, any stress is not applied to the supporting blocks and thus the stable characteristic obtained.

BRIEF DESCRIPTION OF THE DRAWINGS

FIG. 2 is a schematic plan view illustrating an embodiment of the interferometer according to the invention;

FIG. 3 is a plan view depicting the interferometer shown in FIG. 2;

FIG. 4 is a side view showing an optical compensator installed in the interferometer illustrated in FIG. 2;

FIGS. 5A and 5B are side views showing an optical compensator provided in the interferometer of FIG. 2;

DESCRIPTION OF THE PREFERRED EMBODIMENTS

Figure 1:
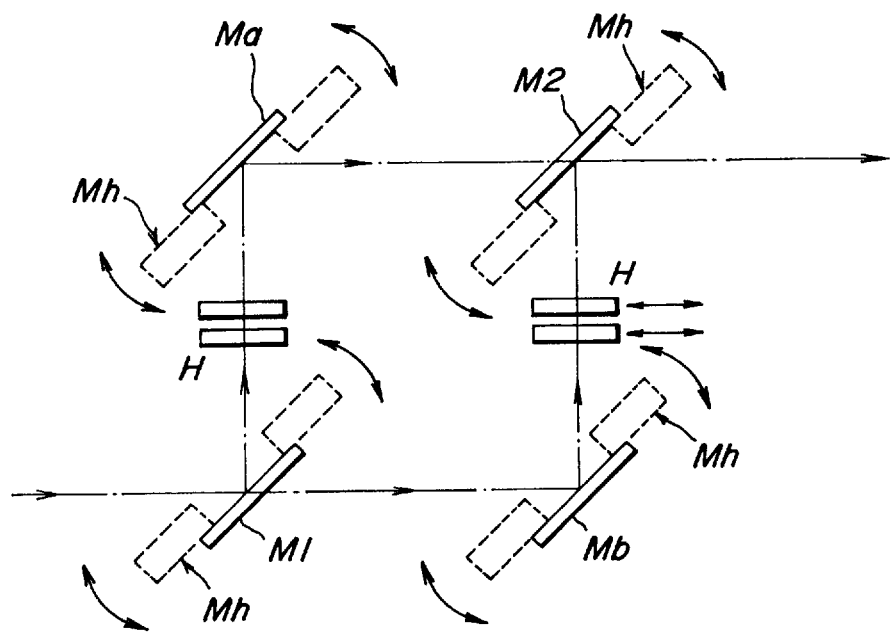
FIG. 1 is a schematic view showing a known Mach-Zehnder type interferometer.

FIG. 2 shows a whole construction of an embodiment of the interferometer of Mach-Zehnder type according to the invention.

FIG. 2, a reference numeral 10 denotes a light source section, 20 an interference optical path section, and 30 represents an interference fringe monitoring and/or detecting section.

The light source section 10 includes a light source 11 and an entrance optical system 12. The light source 11 may be formed by a laser light source. A light flux emitted by the light source 11 is made incident upon the entrance optical system 12 and is converted thereby into a parallel light flux. The entrance optical system 12 may be constructed toy a condenser lens.

The parallel light flux emanating from the light source section 10 is made incident upon the interference optical path section 20. The interference optical path section 20 constitutes a main section of the interferometer. The interference optical path section 20 comprises first, second, third and fourth optical elements 21, 22, 23 and 24. The first optical element 21 is formed by a beam splitter which divides the incident light flux into first and second light fluxes. Each of the third and fourth optical elements 23 and 24 is formed by a light flux deflecting element. Therefore, the first light flux emanating from the first optical element 21 is deflected by the third optical element 22 onto the second optical element 22, and the second light flux emanating from the first optical element 21 is deflected by the fourth optical element 24 onto the second optical element 22. The second optical element 22 is formed by a light flux mixing optical element. In the present embodiment, the first and second optical elements 21 and 22 are formed by half mirrors M1, M2 which are also used In the known Mach-Zehnder type interferometer shown in FIG. 1, and the third and fourth optical elements 23 and 24 are formed by reflection mirrors Ma and Mb which are used in the known Mach-Zehnder interferometer. That is to say, the first optical element M1 of the Mach-Zehnder type interferometer is formed by the beam dividing optical element, the second optical element M2 is constructed by the beam mixing optical element, and the third and fourth optical elements Ma and Mb are constituted by the reflecting optical elements.

According to the present invention, these optical elements 21–24 of the interference optical path section 20 are supported by two hollow supporting blocks each having a rectangular cross section. In this case, a plurality of optical elements are provided in one hollow supporting block. That is to say, a plurality of optical elements are secured to the supporting block such that an optical path is defined within a space of the hollow supporting block.

In the present embodiment, the two hollow supporting blocks are mounted on a surface of an optical bench such that mutually opposing side surfaces of these blocks are parallel with each other. As will be explained later with reference to FIG. 3, the first and third optical elements M1 and Ma are arranged on the first supporting block and the second and fourth optical elements M2 and Mb are arranged on the second supporting block.

The supporting block is preferably made of a material having a small coefficient of thermal expansion such as ceramics. That is to say, the supporting block may be preferably made of SiN or SiC.

The entrance light beam emanating from the light source section 10 is made incident upon the first half mirror M1. The first light flux reflected by the half mirror M1 passes along a first optical path P1 and is made incident upon the reflection mirror Ma. The first light flux reflected by the reflection mirror Ma is made incident upon the second half mirror M2. The second light flux transmitted through the first half mirror M1 propagates along a second optical path P2 and is reflected by the second reflection mirror Mb. The second light flux reflected by the reflection mirror Mb is made incident upon the second half mirror M2. A specimen to be examined is placed in an optical path between the light source section 10 and the interference optical path section 20 or in the first or second optical path P1 or P2 in the interference optical path section 20. In an ideal case in which no specimen is provided, a difference between the first and second optical path lengths should be zero. When a specimen is provided, there are produced interference fringes in accordance with a phase difference between the first light flux propagating along the first optical path P1 and the second light flux propagating along the second optical path P2. The thus produced interference fringes are detected by the interference fringe monitoring and/or detecting section 50. This section 50 comprises a fringe monitor and/or detector 51. The fringe monitor and/or detector 51 may be constructed in various ways in accordance with applications of checking and measuring the interference fringes. For instance, the monitor and/or detector 51 may include an optical system for projecting or forming an image of the interference fringes and a photo-electric converter for converting an optical image of the interference fringes into an electrical signal. In this case, it is possible to obtain electrical signal data representing an intensity of the interference fringes. Then, to the interference fringe monitoring and/or detecting section 50 may be connected a data processing unit and image display monitor.

It should be noted that if the light flux dividing element in the interference optical path section 20 is formed by an element utilizing a polarization of the light flux, then an analyzer may be provided in the interference fringe monitoring and/or detecting section 50.

As shown in FIG. 3, in the present embodiment, the mirrors M1, M2, Ma and Mb are supported by two hollow supporting blocks 31 and 32. The blocks 31 and 32 are made of ceramics having a small thermal expansion. Each of the blocks 31 and 32 is formed as a hollow body having a rectangular cross section and opposing side walls are placed in parallel with each other, mirrors being secured to said parallel side walls. Front and rear ends 33 and 34 of the hollow supporting block 31, 32 are opened to constitute end opening through which a light flux passes. In the side walls of the supporting block 31, 32, there are formed windows 36 and 37 and mirrors M1 and Ma are secured to said windows 36 and 37, respectively.

As explained above, in the present embodiment, the first half mirror M1 is secured to an outer surface of the side wall of the block 31 at the window 36 and the first reflection mirror Ma is secured onto an outer surface of the opposite side wail at the windows 37. Similarly, the second half mirror M2 is secured to an outer surface of one of the mutually opposing side walls of the supporting block 32 and the second reflection mirror Mb is secured onto an outer surface of the other side wall. It should be noted that the side wall of the supporting block 31 to which the first half mirror M1 is secures is brought into contact with the side wall of the other supporting block 32 to which the second half mirror M2 secured. Then, all the side walls of the supporting blocks 31 and 32 are made in parallel with each other, because the surfaces of these side walls are formed precisely.

The entrance light flux is made incident upon the first half mirror M1 via the end opening 33 of the first block 31 and is divided thereby into first and second light fluxes. The first light flux reflected by the half mirror M1 is made incident upon the first reflection mirror Ma via the window 37 and the first light flux reflected by the reflection mirror Ma is made incident upon the second half mirror M2 provided on the second block 32 by means of the end opening 34 of the first block 31. The second light flux transmitted through the first half mirror M1 is made incident upon the second reflecting mirror Mb through the end opening 33 of the second block 32. The second light flux reflected by the reflection mirror Mb is made incident upon the second half mirror M2. Then, the mixed light flux emanating from the second half mirror M2 propagates through the end opening 34 of the second block 32.

In this manner, the first and second half mirrors M1, M2 and the first and second reflecting mirrors Ma, Mb are arranged in parallel with each other in a very precise tanner. In this case, the supporting blocks 31 and 32 are used as the mirror supporting member, the mirrors can be installed in a simple and easy manner.

It is preferable that the supporting blocks 31 and 32 are arranged on a surface of an optical bench by means of a kinematic mount. An example of such a kinetic mount will be explained later. The optical bench is widely used to arrange optical elements in a two-dimensional manner, in which the upper surface of the optical bench serves as a reference plane for positioning the optical elements. As the optical bench for the interferometer, it is preferable to use the optical bench having a large surface area and being made of a metal which can be easily machined. When the kinetic mount is used to arrange the blocks 31 and 32 on the optical bench, although the optical bench is made of a metal having a large thermal expansion, there is not produced any stress, and thus it is possible to realize the interferometer having stable characteristics for a temperature variation.

As illustrated in FIG. 3, in the present embodiment, compensating or adjusting optical elements H may be arranged within inner spaces of the hollow supporting blocks 31 and 32, said adjusting optical elements being provided in the first and second optical paths.

According to the invention, the interference optical path section 20 depicted in FIG. 2 is constructed as shown in FIG. 3, and then it is possible to obtain a Mach-Zehnder type interferometer which can be manufactured and adjusted easily and precisely, and has a stability for a mechanical vibration as well as for a temperature variation. Therefore, it is possible to monitor and/or detect precisely interference fringes by the interference fringe monitoring and/or detecting section 50. Moreover, in the present embodiment, an angle of mirror surface can be precisely determined in a simple manner by using the supporting blocks 31 and 32.

In the present embodiment, the mirrors M1, M2, Ma and Mb are all secured to the supporting blocks 31 and 32 and these blocks are arranged on the optical bench by means of the kinetic mount. Then, all adjustments including an adjustment of the optical path length are carried out by means of the adjusting optical elements H arranged within the hollow supporting blocks.

FIG. 4 shown an embodiment of the adjusting optical element H. In the present embodiment, the adjusting optical element H includes first and second optical wedges H1 and H2, which are arranged such that inclined surfaces of these optical wedges are opposed to each other. The optical wedges H1 and H2 are made of glass.

The optical wedges H1 and H2 are arrarged within the second supporting block 32 in the optical path between the second reflecting mirror Mb and the second half mirror M2. By moving the first and second optical wedges H1 and H2 in a direction perpendicular to the optical path as shown by double headed arrows in FIG. 4, it is possible to change or adjust the optical path length, while an exit light flux is always remained to be parallel with an incident light flux.

It should be noted that the optical element for adjusting an optical path length may be formed by any other optical element than the optical wedges. For instance, an optoelectric element whose refractive index is changed in accordance with an applied voltage may be utilized.

FIGS. 5 and 6 illustrate embodiments of the adjusting optical element to be arranged within the first supporting block 31 in the optical path between the first half mirror M1 and the first reflecting mirror Ma for adjusting an angle of wave fronts of the first and second light fluxes as well as a position of an optical axis. The optical adjusting element includes first and second optical wedges H1' and H2' like as the embodiment shown in FIG. 4. When the optical wedges H1' and H2' are rotated from a position shown in FIG. 5A into a position illustrated in FIG. 5B about an axis perpendicular to the optical axis by an angle ±α, it is possible to adjust a position of an optical axis. That is to say, the optical axis can be shifted horizontally.

Figure 6A:
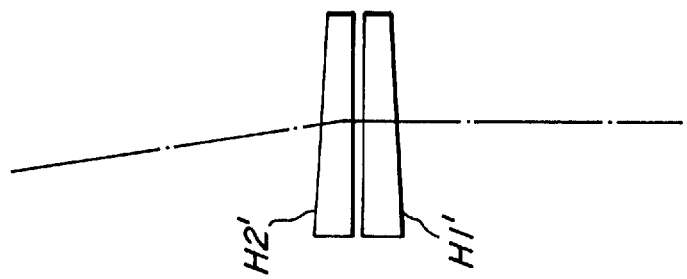
FIGS. 6A, 6B and 6C are side views representing the function of the optical compensator.
Figure 6B:
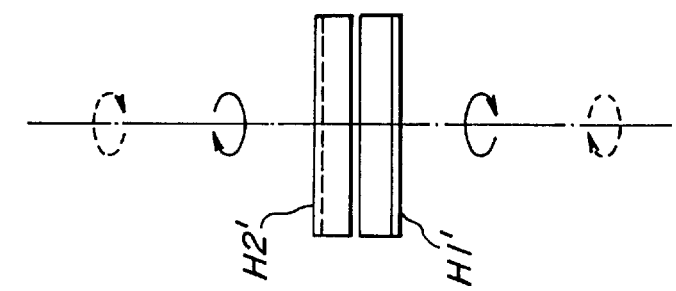
Figure 6C:
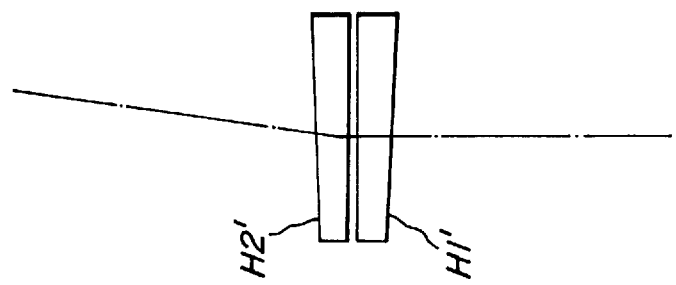

Furthermore, the optical wedges H1' and H2' are arranged to be rotated about the optical axis as depicted in FIGS. 6A, 6B and 6C. That is to say, the optical wedges H1' and H2' are rotated in opposite directions by the same angle. Then, an angle of the wave front can be adjusted. Now it is assumed that the optical wedges H1' and H2' are in a condition shown in FIG. 63. When the wedges are rotated by 90 degrees in opposite directions shown by solid arrows, the wedges are driven into a condition illustrated in FIG. 6C. When the wedges H1' and H2' are rotated by 90 degrees in opposite directions shown by broken arrows in FIG. 6B, the wedges are driven into a condition depicted in FIG. 6A. In this manner, by rotating the optical wedges H1' and H2' in opposite directions, it is possible to adjust an angle of a wave front.

Figure 7:
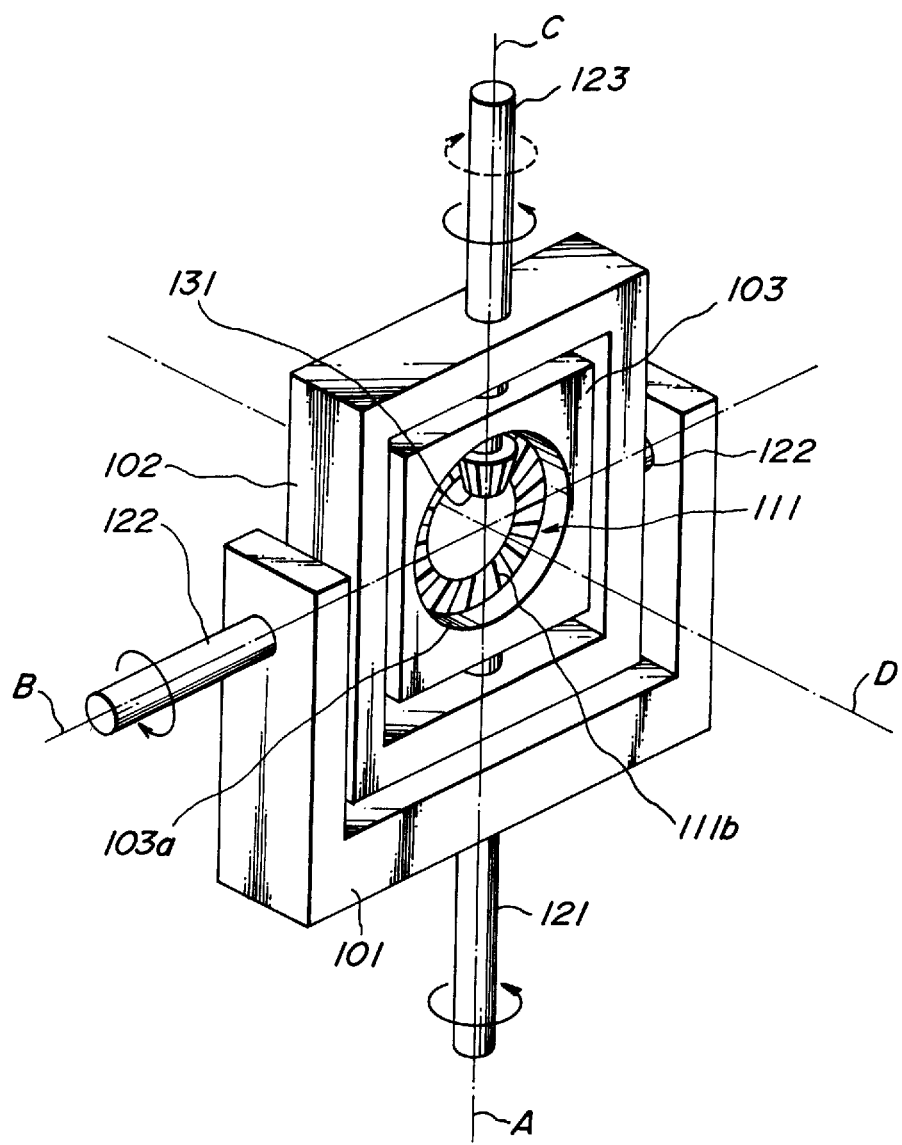
FIG. 7 is a perspective view illustrating a driving mechanism for optical wedges.

FIGS. 6 and 7 show an embodiment of a driving mechanism for driving the optical wedges H1' and H2' in the manner explained above with reference to FIGS. 4 and 5. The mechanism comprises an outer support frame 101 having a shaft 121 secured thereto. By rotating the shaft 121, the outer frame 101 is rotated about an axis A. within the outer frame 101, is arranged an inner frame 102 which is coupled with the outer frame 101 by means of shafts 122 at side arms of the outer frame 101.

By rotating the shafts 122, the inner frame 102 is rotated about an axis B. Within the inner frame 102, is provided a stationary support 103. The stationary support 103 is secured to inner side walls of the inner frame 102. Within a circular hole 103a of the stationary support 103 is arranged rotatably a pair of rotating frames 111 and 112.

Figure 8:
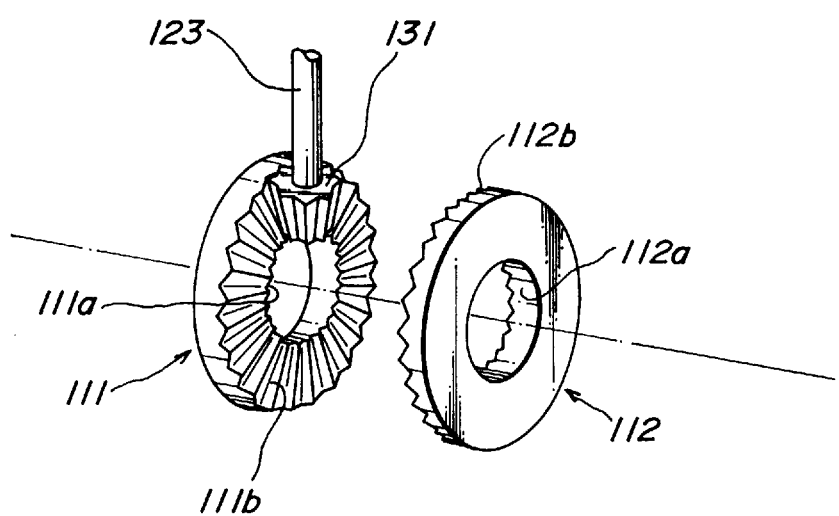
FIG. 8 is a perspective view depicting a part of the driving mechanism.

As illustrated in FIG. 8, the rotating frames 111 and 172 have formed therein center holes 111a and 112a, respectively and ring shaped bevel gears 111b and 112b, respectively. A shaft 123 is supported rotatably by the inner frame 102 and a small bevel wheel 131 is secured to a lower end of the shaft 123. The bevel wheel 131 is engaged with the bevel gears 111b and 112b. Therefore, by rotating the shaft 123 about an axis C, it is possible to rotate the rotating frames 111 and 112 in opposite directions by the same amount about an axis D. The optical wedges H1' and H2' are secured to the center holes 111a and 112a of the rotating frames 111 and 112, respectively.

By rotating the shafts 121 and 122, the optical wedges H1' and H2' can be adjusted as shown in FIGS. 5A and 5B. That is to say, when the shaft 121 is rotated about the axis A, the whole adjusting mechanism including the outer frame 101, inner frame 102, stationary support 103 and rotating frames 111 and 112 is rotated. Therefore, an azimuth angle of the rotating frames 111 and 112 into which these frames face is changed. When the shaft 122 is rotated about the axis B, an assembly of the inner frame 102, stationary support 103 and rotating frames 111, 112 is rotated with respect to the outer frame 101, and thus an elevation angle of the rotating frames 111, 112 face is changed. In this manner, by rotating the shafts 121 and 122, it is possible to change a direction to which the optical wedges H1' and H2' face, and thus the optical axis of the optical wedges can be shifted horizontally.

By rotating the shaft 123 about the axis C, it is possible to rotate the optical wedges H1' and H2' in opposite directions by the same angle about the axis D. In this manner, an angle of a wave front can be adjusted.

The above mentioned shafts 121, 122 and 123 may be coupled with rotationally driving sources such as electric motors by means of suitable driving force transmitting means and may be rotated by controlling the motors. Then, the various adjustments can be performed simply and precisely without requiring a labor work of a human being.

Now an example of the kinetic mount for mounting the supporting block on the optical bench will be explained with reference to FIGS. 9–13.

Figure 11:
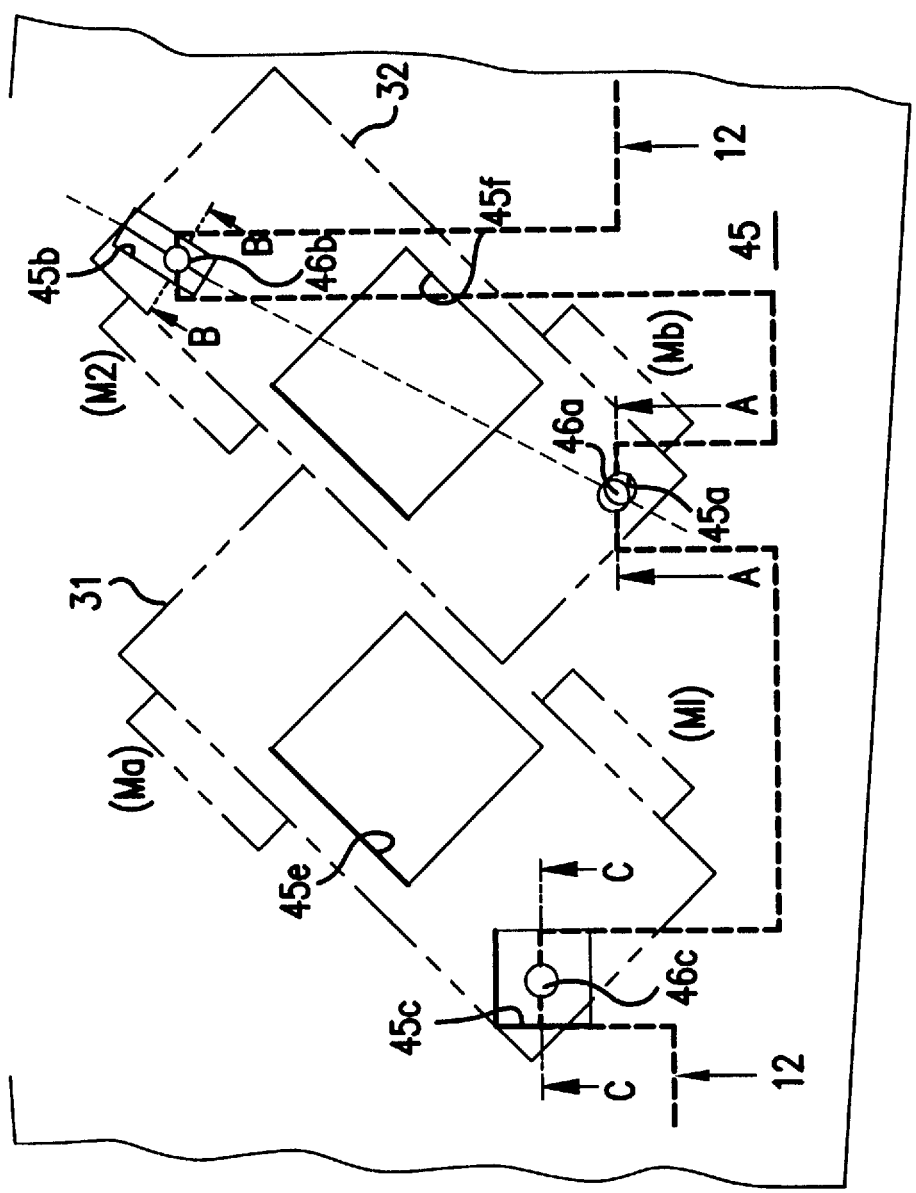
FIG. 11 is a plan view depicting a surface of an optical bench.
Figure 12:
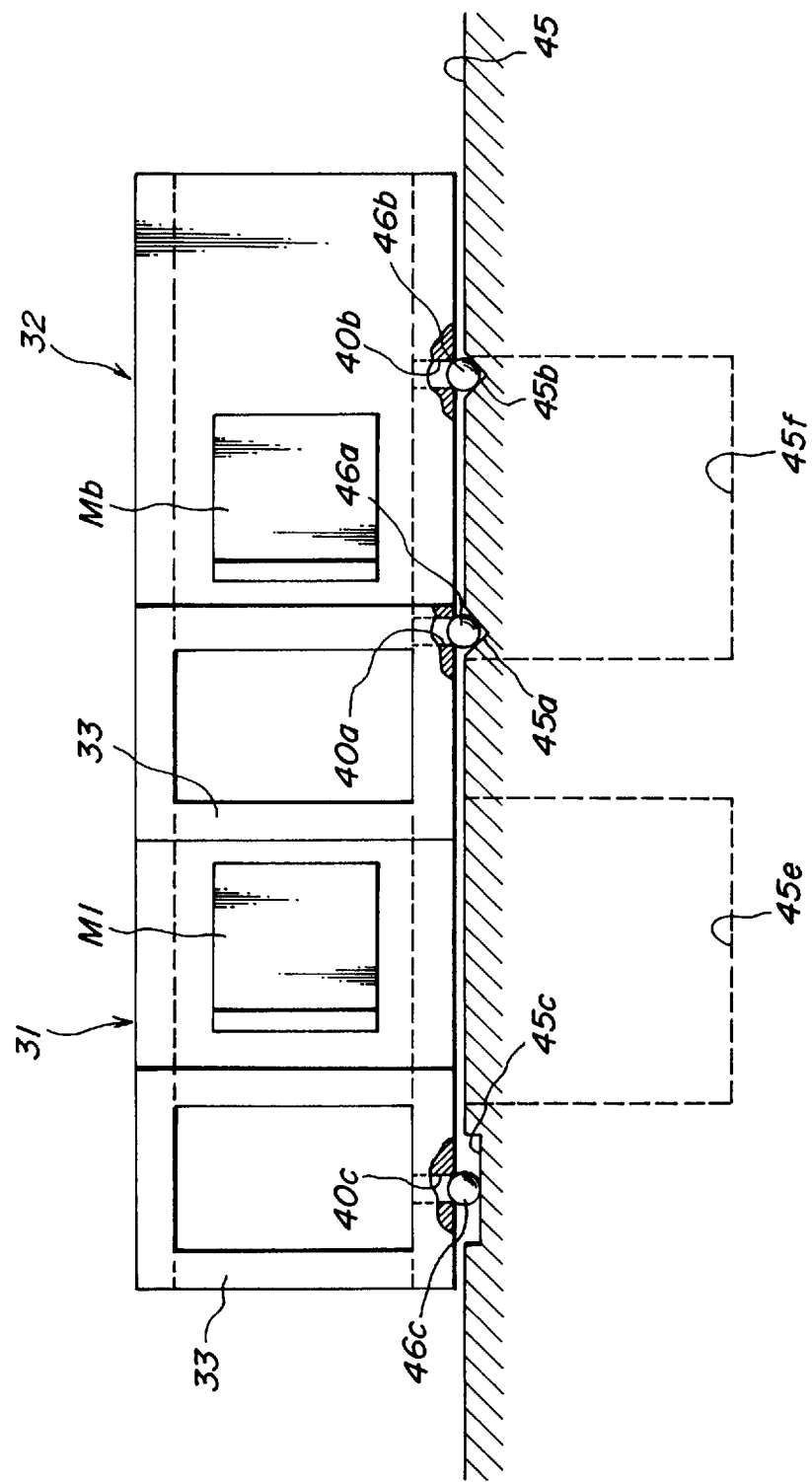
FIG. 12 is a partial cross section illustrating a kinetic mount provided in the interferometer according to the invention.

FIG. 9A is a side view showing the supporting block 31, and FIG. 9B is a cross sectional view cut along a line A—A in FIG. 9A. It should be noted that the supporting block 32 has the identical construction. FIG. 10 is a plan view showing an assembly of the supporting blocks 31 and 32. FIG. 11 is a plan view illustrating an arrangement of the assembly of the supporting blocks 31 and 32 on the optical bench. FIG. 12 is a cross sectional view of the assembly of supporting blocks on the optical bench.

Figure 9:
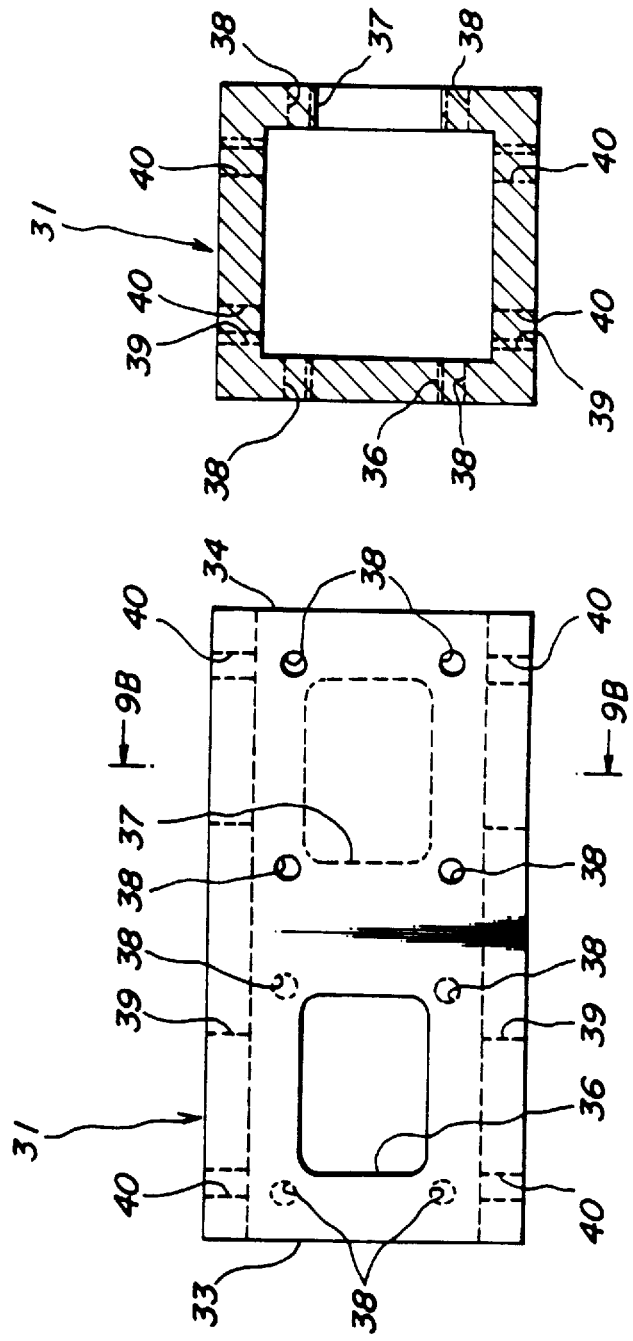
FIGS. 9A and 9B are side and cross sectional views, respectively of the supporting block.
Figure 10:
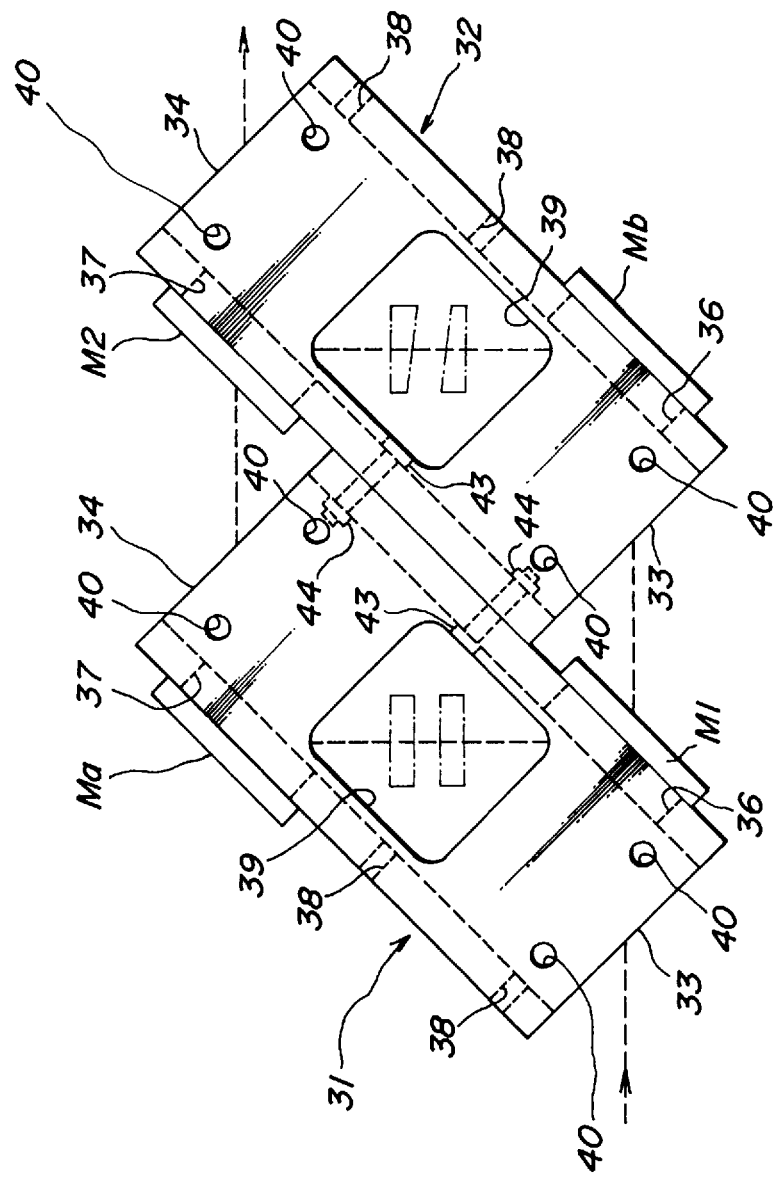
FIG. 10 is a plan view showing an assembly of supporting blocks according to the invention.

As depicted in FIGS. 9 and 10, the supporting block 31 comprises substantially rectangular openings 36 and 37 at which the mirrors M1 and Ma are secured, respectively. In the mutually parallel side walls of the supporting block 31, there are formed through holes 39 for coupling the supporting blocks 31 and 32 with each other by means of bolts. In the upper and lower walls of the supporting block 31, there are formed windows 39 at which the adducing optical elements are secured. In the upper and lower walls of the supporting block 31 there are further formed through holes 40 near corners of thereof.

At first, the mirrors M1 and Ma are secured to the first supporting block 31 at the openings 36 and 37, and similarly the mirrors M2 and Mb are secured to the second supporting block 32 at the corresponding openings 36 an 37. Then, these first and second supporting blocks 31 and 32 are coupled with each other as illustrated in FIG. 10 by means of bolts 43 and nuts 44. It should be noted that after assembling the first and second supporting blocks 31 and 32, the mirrors M1, M2, Ma and Mb may be secured to these blocks at respective openings 36 and 37. On the present embodiment, the supporting block is constructed symmetrically with respect to mutually orthogonal axes such that any side walls of the blocks may be brought into contact with each other and any one of the upper and lower surfaces may be placed on the optical bench. Therefore, the supporting blocks having the identical structure may be commonly used as any of the first and second supporting blocks.

An assembly of the first and second supporting blocks 31 and 32 is then placed on the optical bench. As illustrated in FIGS. 11 and 12, the assembly of the supporting blocks is supported at three points by means of balls. That is to say, at three holes 40a, 40b and 40c (see FIG. 12) among the eight holes 40 formed in the lower walls of the first and second supporting blocks 31 and 32 there are provided balls 46a, 46b and 46c as shown in FIG. 11. It should be noted that a diameter of these balls is slightly larger than a diameter of the holes 40. :n a surface of the optical bench 45 ,here are formed depressions 45a, 45b and 45c corresponding to respective balls 46a, 46b and 46c. In FIG. 12, cross sectional views cut along line 12 —12 is shown. The depression 45a has a cone-shaped configuration, the depression 45b is formed as a V-shaped recess, and the depression 45c is formed to have a rectangular recess with a flat bottom surface. It should be noted that the V-shaped recess 45b extends in a direction on which the cone-shaped recess 45a is existent as illustrated in FIG. 11.

In the surface of the optical bench 45, there are further formed depressions 45e and 45f which serve to accommodate driving mechanism for adjusting angles of the optical wedges and sliding mechanisms. It should be noted that these depressions 45e and 45f are formed at positions corresponding to the windows 39 at which the adjusting optical elements are provided. The adjusting mechanism illustrated in FIGS. 7 and 8 may be utilized.

In the manner explained above, the ball 46a positioned at the hole 40a is inserted into the cone-shaped recess 45a such that the ball is contacted with the inner surface of the cone-shaped recess along a circle. Therefore, one point of the three supporting points is determined. Within the V-shaped recess 45b, the bail 46b provided in the hole 40b is brought into contact with the recess walls at two points and is slidable in the direction of the recess. Within the recess 45c, the ball 46c provided in the hole 40c is brought into contact with the flat bottom surface of the recess at a single point, and is movable in any direction.

In this manner, the assembly of the first and second supporting blocks 31 and 32 is supported on the optical bench 45 at three supporting points. In this case, the second supporting point defined by the ball 46b and recesses 45b can move with respect to the first supporting point defined by the ball 46a and recess 45a in the direction in which the V-shaped recess 45b extends. The third supporting point defined by the ball 46c and rectangular recess 45c with a flat bottom can move in any direction. Therefore, when the optical bench 45 made of a metal is expanded or shrunk due to a temperature variation, this deformation of the optical block is absorbed by the movement of the second and third supporting points. This results in that the deformation of the optical bench 45 is not transferred to the supporting blocks 31 and 32, and thus the positional relationship between the mirrors M1, M2, Ma and Mb is not changed at all except for a very small variation due to the thermal expansion or shrinkage of the supporting blocks per se. As explained above, the supporting blocks 31 and 32 are made of a material having a very low coefficient of thermal expansion.

Figure 13:
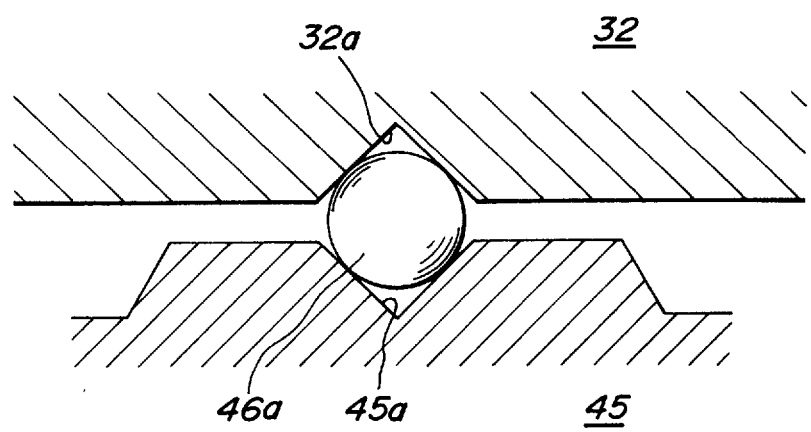
FIG. 13 is a cross sectional view showing another embodiment of the kinetic mount.

In the present embodiment, the balls 46a, 46b, 46c are supported by the holes 40a, 40b, 40c formed in the bottom walls of the supporting blocks 31, 32. However, according to the invention, the ball 46a may be supported by a cone-shaped recess 32a formed in a lower surface of the block 32 as depicted in FIG. 13.

The interferometer according to the invention may be utilized for various applications such as detection of defect in photomask, reticle pattern and liquid crystal display panel, and a measurement of a phase shift mask.

The present invention is not limited to the embodiment explained above, but many modifications and alternations may be conceived by those skilled in the art within the scope of the invention. For instance, in the above embodiment, the outer surfaces of side walls of first and second supporting blocks are processed to be in parallel with each other and the mirrors are secured to these outer surfaces. However, according to the invention, the mirrors may be secured to inner surfaces of side walls of blocks. In this case, it is necessary to process the inner surfaces precisely such that they are in parallel with each other. Moreover, in the above embodiment, the supporting block is made of ceramics such as silicon nitride and silicon carbide, but according to the invention, the supporting block may be made of a metal having a small coefficient of thermal expansion such as invar alloy. In the embodiment illustrated in FIG. 6, the two optical wedges are arranged such that their flat surfaces face each other, but according to the invention, the optical wedges may be arranged such that inclined surfaces face each other. Furthermore, the adjustment of the optical wedges may be carried out manually instead of using the driving motors.

What is claimed is:

1. An interferometer of Mach-Zehnder type comprising:
    an optical bench having a surface;
    an optical system including a first optical element for dividing an input light flux from a light source into first and second light fluxes propagating along first and second optical paths, second and third optical elements for defining said first and second optical paths, respectively, and a fourth optical element for mixing said first and second light fluxes propagating along said first and second optical paths into a single output light flux which generates interference fringes;
    a supporting means including first and second hollow rectangular supporting blocks, said first supporting block supporting said first and second optical elements and said second supporting block supporting said third and fourth optical elements, with light fluxes propagating through hollow inner spaces of said supporting blocks; and
    a means for mounting said supporting means on said surface of the optical bench.

2. An interferometer according to claim 1, wherein said first and fourth optical elements are formed by first and second half mirror, respectively and said second and third optical elements are formed by first and second reflection mirrors, respectively.

3. An interferometer according to claim 2, wherein said first half mirror and first reflection mirror are secured to mutually opposing first and second side walls of the first hollow rectangular supporting block, respectively, said second reflection mirror and second half mirror are secured to mutually opposing first and second side walls of the second hollow rectangular supporting block, respectively, and said first side wall of the first supporting block is coupled with said second side wall of the second supporting block such that these blocks are shifted in a direction parallel to longitudinal axes of the supporting blocks in such a manner that the entrance light flux is made incident upon the first half mirror through a first end opening of the first supporting block, said first light flux is made incident upon the first reflection mirror via the inner space of the first supporting block and then is made incident upon the second half mirror through a second end opening of the first supporting block, said second light flux is made incident upon the second reflection mirror through a first end opening of the second supporting means and is then made incident upon the second half mirror through the inner space of the second supporting block, and said output light flux emanates from said second half mirror through a second end opening of the second supporting block.

4. An Interferometer according to claim 3, wherein said optical system further comprises first and second optical adjusting means, each arranged in said first and second optical oaths within said first and second supporting blocks, respectively.

5. An interferometer according to claim 4, wherein one of said first and second optical adjusting means includes first and second optical wedges arranged slidably with respect to an optical axis to adjust an optical path length.

6. An interferometer according to claim 5, wherein the other of said first and second optical adjusting means comprises first and second optical wedges arranged to be tilted to adjust a position of she optical axis.

7. An interferometer according to claim 6, wherein said other optical adjusting means further comprises a means for rotating said first and second optical wedges about the optical axis in opposite directions by an identical amount to adjust a wave front.

8. An interferometer according to claims 1, wherein said supporting blocks are made of ceramics.

9. An interferometer according to claim 8, wherein said supporting blocks are made of silicon nitride or silicon carbide.

10. An interferometer according to claim 1, wherein said supporting blocks are made of an invar alloy.

11. An interferometer according to claim 1, wherein said mounting means comprises a kinematic mount for mounting an assembly of said first and second hollow rectangular supporting blocks on the surface of said optical bench such that an expansion and shrinkage of the optical bench are absorbed and are transmitted to the assembly of the first and second supporting blocks.

12. An interferometer according to claim 11, wherein said kinematic mount includes first, second and third mounting units, said first mounting unit comprises a cone-shaped recess formed in the surface of the optical bench and a ball inserted in said cone-shaped recess, said second mounting unit includes a V-shaped recess formed in the surface of the optical bench and extending in a direction on which said cone-shaped recess situates and a ball inserted in the V-shaped recess, and said third mounting unit comprises a wide recess with a flat bottom formed in the surface of the optical bench and a ball placed in said wide recess, said wide recess having a dimension sufficiently larger than a diameter of the ball.

13. An interferometer according to claim 12, wherein said balls of the first, second and third mounting units are held in position by means of holes formed in bottom walls of said first and second supporting blocks.

14. An interferometer according to claim 12, wherein said balls of the first, second and third mounting units are held in position by means of cone-shaped recesses formed in bottom walls of said first and second supporting blocks.

* * * * *